United States Patent
Bhatt et al.

(10) Patent No.: US 8,099,117 B2
(45) Date of Patent: Jan. 17, 2012

(54) SMS MESSAGE DELIVERY OVER BROADBAND DATA NETWORKS

(75) Inventors: Jay Bhatt, Naperville, IL (US); Yigang Cai, Naperville, IL (US); Alan Curtis, Granville, OH (US); Russell Morgan, Westerville, OH (US); Gyan Shanker, Naperville, IL (US)

(73) Assignee: Alcatel Lucent, Paris (FR)

( * ) Notice: Subject to any disclaimer, the term of this patent is extended or adjusted under 35 U.S.C. 154(b) by 326 days.

(21) Appl. No.: 12/476,184

(22) Filed: Jun. 1, 2009

(65) Prior Publication Data

US 2010/0304765 A1 Dec. 2, 2010

(51) Int. Cl.
*H04W 4/00* (2009.01)
(52) U.S. Cl. ........ 455/466; 370/216; 370/236; 370/237; 370/241; 370/242
(58) Field of Classification Search .......................... None
See application file for complete search history.

(56) References Cited

U.S. PATENT DOCUMENTS

| 2009/0082022 A1* | 3/2009 | Gallagher et al. | 455/436 |
| 2009/0265543 A1* | 10/2009 | Khetawat et al. | 713/151 |
| 2010/0248719 A1* | 9/2010 | Scholaert | 455/434 |

* cited by examiner

*Primary Examiner* — Ajit Patel
(74) *Attorney, Agent, or Firm* — Duft Bornsen & Fishman LLP

(57) ABSTRACT

Broadband messaging gateways, SMS-C's, and associated methods are disclosed that attempt to deliver SMS messages over a broadband data network as opposed to a voice network. When a mobile device sends a Mobile Originated (MO) SMS message, the mobile device sends the MO SMS message to a broadband data network instead of the voice network. The broadband data network then routes the MO SMS message to the appropriate SMS-C. When an SMS-C receives a Mobile Terminated (MT) SMS message destined for a mobile device, the SMS-C forwards the MT SMS message to the broadband data network instead of the voice network. Thus, SMS messages are offloaded from the voice network to the broadband data network.

17 Claims, 15 Drawing Sheets

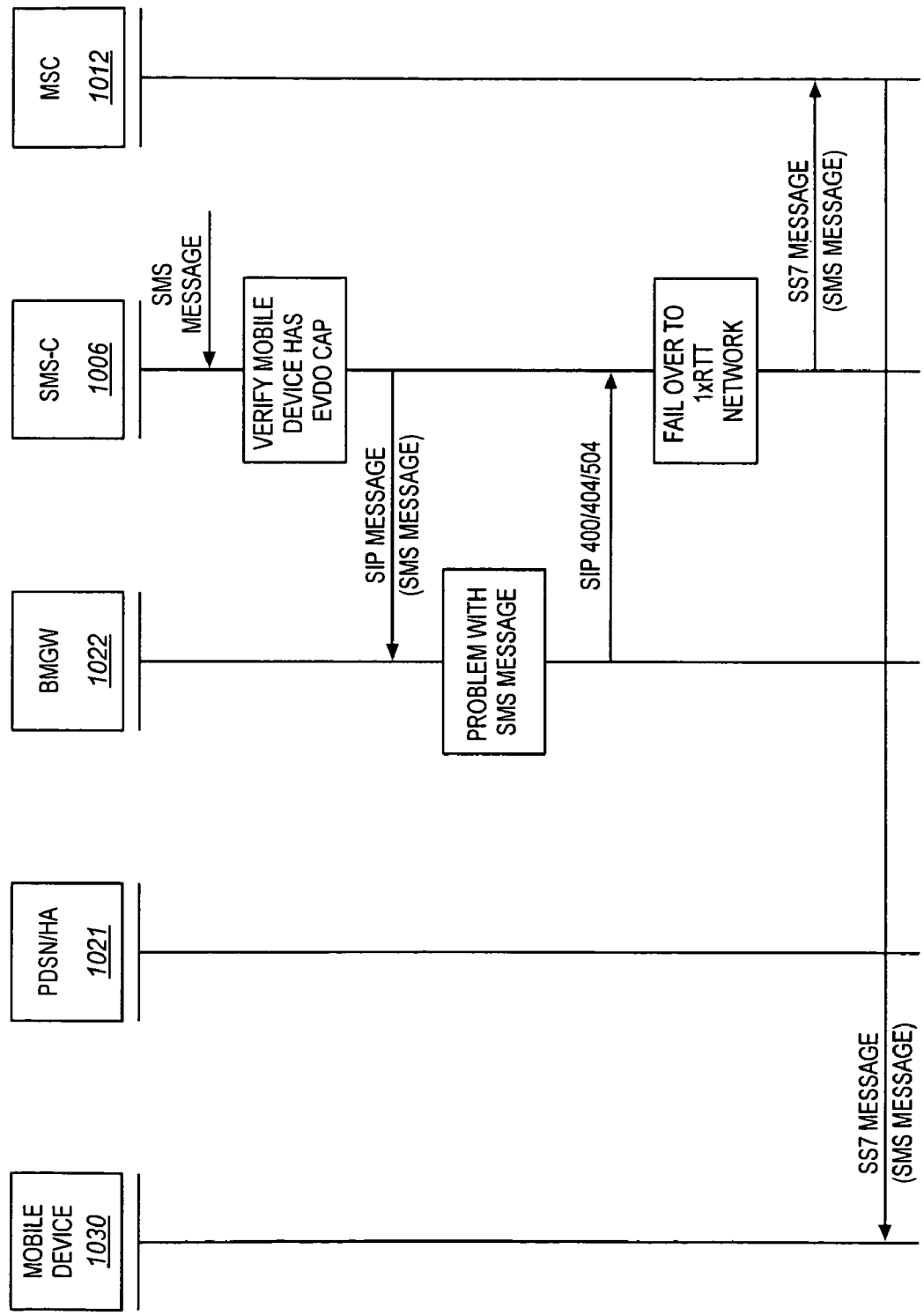

SMS MESSAGE DELIVERY OVER BROADBAND DATA NETWORKS

BACKGROUND

1. Field of the Invention

The invention is related to the field of communications and, in particular, to delivery of SMS messages.

2. Statement of the Problem

In many mobile networks, text messaging has become a very popular mode of communication. Short Message Service (SMS) is a communication protocol allowing the interchange of short text messages (i.e., 160 characters) between mobile devices. Often times, mobile users more frequently use SMS messaging for communication than voice calls.

SMS messages are presently transmitted over signaling channels of a voice network, such as over SS7 channels. A typical voice network includes a Radio Access Network (RAN) that provides an air interface to a mobile device, and a core network that connects the RAN to other networks, such as the PSTN or another RAN. The core network includes a switching system and a subscriber server for serving the mobile device. For instance, in a UMTS network, the switching system may comprise a Mobile Switching Center (MSC) and the subscriber server may comprise a Home Location Register (HLR). In an IP Multimedia Subsystem (IMS) network, the switching system may comprise a Call Session Control Function (CSCF) and the subscriber server may comprise a Home Subscriber Server (HSS). The core network also connects to a SMS Center (SMS-C). The SMS-C is the entity which does the job of storing and forwarding SMS messages to and from mobile devices.

The following illustrates an example of a delivery of a Mobile Terminated (MT) SMS message to a mobile device in a UMTS network. The SMS-C receives an SMS message destined for the mobile device, and stores the SMS message. The SMS-C then queries the subscriber server (i.e., HLR or HSS) for routing information based on the present position of the mobile device. The SMS-C then attempts to deliver the SMS message to the destination by routing the SMS message to the correct MSC through an SS7 channel. The MSC receives the SMS message from the SMS-C, and forwards the SMS message through the RAN to the mobile device using a signaling channel.

In an example of a delivery of a Mobile Originated (MO) SMS message, a sending party enters text into a mobile device, and also enters a phone number or address for the intended destination of the SMS message. When entry of the SMS message is completed, the mobile device sends the SMS message to the MSC over the RAN again using a signaling channel. The MSC that is serving the mobile device receives the SMS message, and routes the SMS message to the SMS-C. The SMS-C stores the SMS message, and attempts to forward the SMS message to the destination.

A high volume of SMS traffic on a traditional voice network can cause problems. For example, each time an SMS message is received at the SMS-C, the SMS-C needs to query the subscriber server (i.e., HLR or HSS) to determine the routing information for the destination of the SMS message. When there is a high volume of SMS messages, a significant amount of messages are exchanged between the SMS-C and the subscriber server, which can reduce the overall operating speed of the voice network. Also, the signaling channels of the voice network can become congested with SMS traffic, as SMS messages are transported over the signaling channels. Even further, the switching systems, such as an MSC or CSCF, have to handle each SMS message, which can cause congestion at the switching systems. A service provider may implement more switching systems to handle higher SMS loads, but the expense of implementing the additional switching systems is undesirable.

SUMMARY

Exemplary embodiments described herein attempt to send SMS messages over a broadband data network instead of over signaling channels of the voice network. Some mobile devices are dual mode, meaning that they are able to communicate with a voice network, such as a UMTS network, and are also able to communicate with a broadband data network, such as an EVDO network. When an SMS message is originated at a dual mode mobile device, the mobile device attempts to route the message over the broadband data network instead of the voice network. When an SMS message is destined for a dual mode mobile device, the SMS-C attempts to route the message to the mobile device over the broadband data network instead of the voice network. Thus, SMS traffic is offloaded from the voice network to the broadband data network, which advantageously avoids congestion on the signaling channels of the voice network. Also, the SMS-C does not need to query the subscriber server (i.e., HLR or HSS) each time it receives an SMS message, which further reduces message traffic in the voice network.

In one embodiment, a communication network is described that is configured to deliver Short Message Service (SMS) messages to a mobile device. The communication network includes a broadband messaging gateway implemented in a broadband data network, such as an EVDO network. The broadband messaging gateway includes a session database, an interface, and a message processor. The session database is configured to store session information for a mobile device that has established a data session over the broadband data network. To store the session information, the interface is configured to receive a notification message from an Authentication, Authorization, and Accounting (AAA) server, or other component which has mobile device registration session information in the broadband data network, that the data session has been set up involving the mobile device. The message processor is configured to process the notification message to identify the session information included in the notification message, validate the session information, and store the session information for the mobile device in the session database. The AAA server thus keeps the broadband messaging gateway notified of session information for the mobile devices.

In an embodiment of a Mobile Originated (MO) scenario, the interface in the broadband messaging gateway is configured to receive the MO SMS message from the mobile device. The message processor is configured to verify that the MO SMS message is valid by comparing information in a header of the MO SMS message with the session information stored in the session database. If the MO SMS message is valid, then the message processor is further configured to identify an SMS-C for the MO SMS message, and route the MO SMS message to the identified SMS-C through the interface. If the MO SMS message is determined to be invalid, then the message processor may be further configured to send an error message to the mobile device to cause the mobile device to attempt to send the MO SMS message over a voice network as a fail over.

In an embodiment of a Mobile Terminated (MT) scenario, the SMS-C is configured to receive an MT SMS message from an originator that is destined for the mobile device, and store the MT SMS message. The SMS-C is further configured to determine whether the mobile device has broadband data capabilities, and forward the MT SMS message to the broadband data network responsive to a determination that the mobile device has broadband data capabilities.

The interface of the broadband messaging gateway is further configured to receive the MT SMS message destined for the mobile device. The message processor is further configured to verify the status of the data session involving the mobile device in the broadband data network. If the data session is active, then the message processor is further configured to identify a Mobile IP (MIP) address for the mobile device, and route the MT SMS message to the mobile device through the interface based on the MIP address. If the session is inactive, then the message processor may be further configured to send an error message to the SMS-C. In response to the error message, the SMS-C is further configured to forward the MT SMS message to the voice network as a fail over.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

FIG. 19 is a message diagram illustrating an unsuccessful delivery of an MT SMS message over an EVDO network in an exemplary embodiment.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
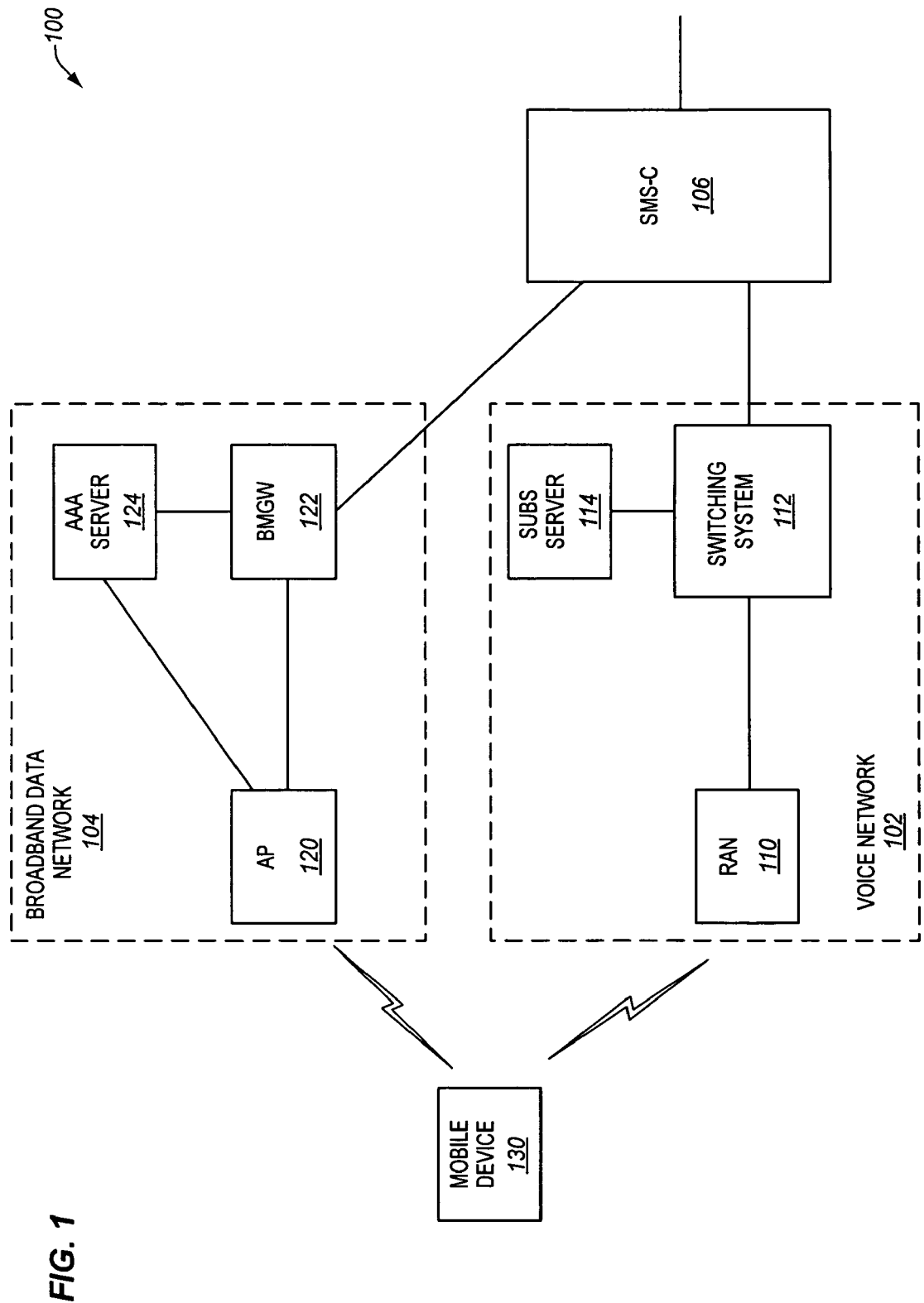
FIG. 1 illustrates a communication network in an exemplary embodiment.

FIG. 1 illustrates a communication network 100 in an exemplary embodiment. Communication network 100 includes a voice network 102, a broadband data network 104, and a Short Message Service Center (SMS-C) 106. Voice network 102 and broadband data network 104 are separate networks generally used for different purposes (one for voice, one for data respectively). However, both networks 102 and 104 may be managed or owned by a common service provider. Voice network 102 and broadband data network 104 are both operable to provide communication services to a dual mode mobile device 130. In the embodiments described below, mobile device 130 and SMS-C 106 will each attempt to send SMS messages over broadband data network 104 first, and then fail over to voice network 102.

Voice network 102 comprises any network that typically provides voice communications via wireless signals. Voice network 102 may include a circuit-based core network, a packet-based core network, and/or another type of core network. An example of voice network 102 includes a cellular network, such as a CDMA network or a GSM network. Although voice network 102 is typically used for voice communication, those skilled in the art understand that voice networks may also transport data communications in some instances.

In FIG. 1, voice network 102 includes a RAN 110, a switching system 112, and a subscriber server 114. RAN 110 comprises any radio or wireless network that interfaces a mobile device with a core network (represented by switching system 112 in FIG. 1). Examples of RAN 110 include a GSM RAN, a CDMA RAN, or a UMTS RAN. Switching system 112 comprises any switch, server, or other device in a core network that serves mobile devices. For instance, switching system 112 may comprise an MSC in a circuit-based network, or may comprise a Call Session Control Function (CSCF) in a packet-based IMS network. Subscriber server 114 comprises any database or similar system that stores and maintains subscriber information or subscriber data for one or more subscribers. For instance, subscriber server 114 may maintain subscriber data in the form of a subscriber record or subscriber profile for a user of mobile device 130. Subscriber server 114 may comprise a single centralized system or may be distributed among multiple systems.

Broadband data network 104 comprises any network that typically provides data communications via wireless signals. Broadband data network 104 may also be referred to as a "broadband data-only network" or a "broadband data-optimized network". Examples of broadband data network 104 include a Wireless Local Area Network (WLAN) using WiFi/WiMax communications, an Evolution-Data Optimized or Evolution-Data Only (EVDO) network, etc. An exemplary implementation of broadband data network 104 may be as an enterprise network in a corporation or campus, or as a "hot spot" in popular public places, such as an airport, coffee shop, etc. Although broadband data network 104 is typically used for data communication, those skilled in the art understand that broadband data networks may transport voice communications, such as VoIP calls.

In FIG. 1, broadband data network 104 includes an access point (AP) 120, one or more broadband messaging gateways (BMGW) 122, and an Authentication, Authorization, and Accounting (AAA) server 124 (or any other network component which has mobile device registration session information and is able to send the information to BMGW 122). Access point 120 (also referred to as a wireless access point (WAP)) comprises any device or component configured to exchange wireless signals with a mobile device for data communications. BMGW 122 comprises any system, server, or component configured to handle SMS messages within broadband data network 104. AAA server 124 (or any other network component which has mobile device registration session information and is able to send the information to BMGW 122) comprises any system configured to manage access to broadband data network 104.

SMS-C 106 comprises any system or server operable to handle SMS messages with a store-and-forward mechanism, such as according to SMS protocol. Although SMS-C 106 is shown in FIG. 1 as outside of voice network 102, those skilled in the art will appreciate that SMS-C 106 may be implemented in voice network 102 or another network not shown in FIG. 1. Although SMS messages and SMS protocol are referenced herein, other text message protocols may be used in other embodiments. Thus, SMS-C 106 may be referred to as a text message server, and SMS messages may be referred to as text messages.

Mobile device 130 comprises any device operable to communicate via wireless signals, such as a mobile phone, a PDA, a PC, a mobile VoIP phone, etc. Mobile device 130 is a dual mode device in this embodiment, meaning that mobile device 130 is able to register and communicate with voice network 102 and broadband data network 104, which may utilize different wireless protocols.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Figure 2:
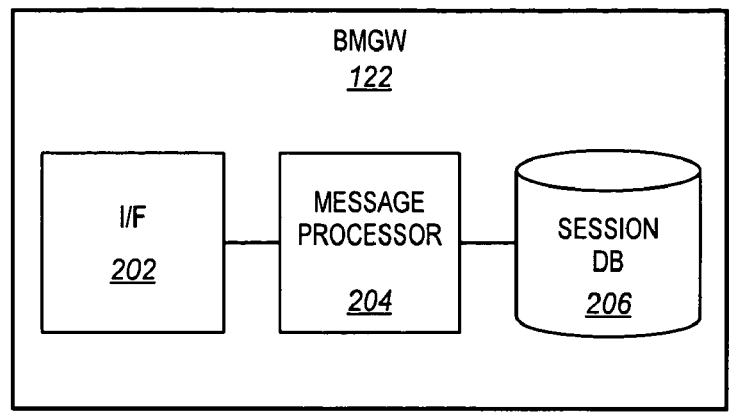
FIG. 2 illustrates a broadband messaging gateway (BMGW) in a broadband data network in an exemplary embodiment.

FIG. 2 illustrates BMGW 122 in broadband data network 104 in an exemplary embodiment. In this embodiment, BMGW 122 includes an interface 202, a message processor 204, and a session database (DB) 206. Interface 202 comprises any device, component, or system configured to transmit and receive signaling messages that include SMS messages. For example, interface 202 may be capable to transmit and receive SIP messages, SS7 messages, etc. Message processor 204 comprises any device, component, or system configured to process signaling messages and/or SMS messages. Session database 206 comprises any storage system configured to store information regarding a session (e.g., a PPP session) within broadband data network 104 (see FIG. 1).

According to the embodiments described below, SMS messages originated by mobile device 130 or destined for mobile device 130 will be routed over broadband data network 104 through BMGW 122. If the SMS message cannot be routed over broadband data network 104, then the SMS message may be routed over voice network 102 as a fail over.

Because SMS messages can be sent over broadband data network 104, mobile device 130 first registers with this network. To register, mobile device 130 transmits a register message, such as a SIP REGISTER, through AP 120 to AAA server 124. In response to the register message, AAA server 124 operates to authenticate mobile device 130, and set up a session for mobile device 130 over broadband data network 104. The session established for mobile device 130 is a data session, such as a Point-to-Point Protocol (PPP) session.

In addition to registering mobile device 130, AAA server 124 notifies BMGW 122 of the session that was set up for mobile device 130 in the event that an SMS message originates from or is sent to mobile device 130. Thus, interface 202 within BMGW 122 receives a notification message from AAA server 124 that mobile device 130 has registered with broadband data network 104 and a session has been set up (see also FIG. 2). One example of the notification message is a SIP NOTIFY. The notification message may include a variety of information regarding the session. For example, the notification message may include a mobile directory number (MDN) for mobile device 130, a Mobile IP (MIP) address for mobile device 130, a session status indicator (i.e., active or inactive), and a timestamp (session setup timestamp or session release timestamp).

Message processor 204 processes the notification message to identify the session information included in the notification message, and to validate the session information. If some of the session information included in the notification message is missing or incorrect, then message processor 204 will reject the notification (i.e., invalid session information) and send an error message back to AAA server 124 through interface 202. Message processor 204 may also determine whether the MIP address included in the notification message has already been mapped to another MDN, and if so sends an error message to AAA server 124. Message processor 204 may also determine whether a session setup timestamp included in the notification message is already stored in session database 206, and if so sends an error message to AAA server 124. If the session information in the notification message is complete and valid, then message processor 204 stores the session information for mobile device 130 in session database 206.

When storing the session information, in one embodiment, message processor 204 may maintain two data structures in session database 206. In one data structure, message processor 204 may map the MDN to the MIP address for mobile device 130, with the MDN used as the searching key. In the other data structure, message processor 204 may again map the MIP address to the MDN for mobile device 130, with the MIP address used as the searching key.

While the session is active in broadband data network 104, AAA server 124 may periodically send notification messages to BMGW 122. In response to the periodic notification messages, message processor 204 updates the session information (except for session setup timestamp) stored in session database 206. If the session involving mobile device 130 is torn down or released in broadband data network 104, then AAA server 124 also notifies BMGW 122 of this event through another notification message. The session involving mobile device 130 may be torn down for a variety of reasons, such as mobile device 130 being powered off, traveling out of the service area of broadband data network 104, etc. When the session is torn down, interface 202 receives a notification message from AAA server 124 that mobile device 130 is no longer registered with broadband data network 104 and the session has expired. Message processor 204 processes the notification message to identify the session information included in the notification message. If some of the session information included in the notification message is missing or incorrect, then message processor 204 will reject the notification and send an error message back to AAA server 124. Also, if the MIP address in the notification message does not match the MIP address stored in session database 206, then message processor 204 will reject the notification and send an error message back to AAA server 124. If the session release timestamp is already stored in session database 206, then BMGW 122 will send an error message to AAA server 124. If the session information in the notification message is complete and correct, then message processor 204 stores the session information for mobile device 130 in session database 206.

Through the notification messages provided by AAA server 124, message processor 204 updates entries in session database 206. Message processor 204 may also audit the session information for mobile device 130 and clean up the session information responsive to an expiration timer. A similar process is used for other mobile devices (not shown) using broadband data network 104 so that information stored in session database 206 corresponds with those mobile devices presently or formerly registered with broadband data network 104.

Figure 3:
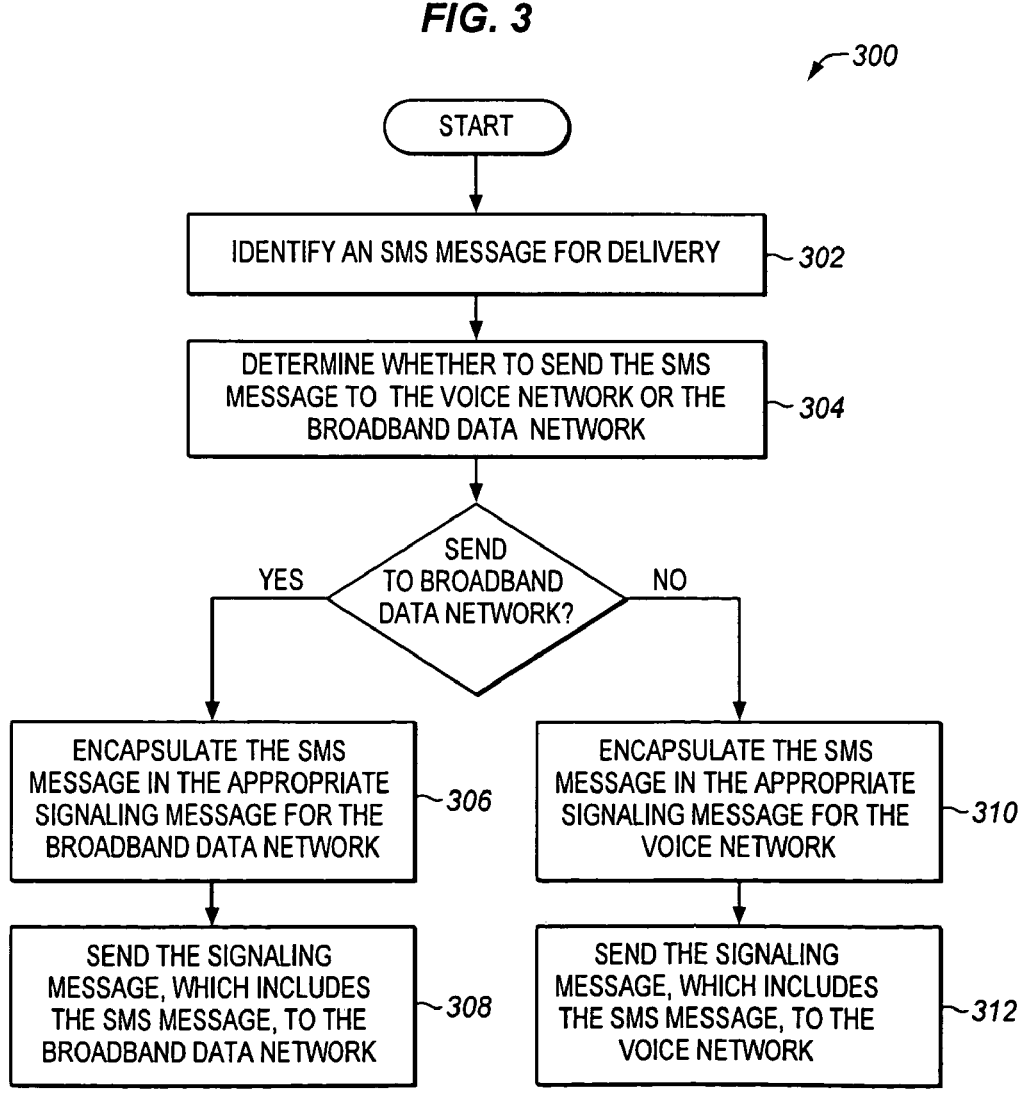
FIGS. 3-4 are flow charts illustrating a method of delivering a Mobile Originated (MO) SMS message in an exemplary embodiment.
Figure 4:
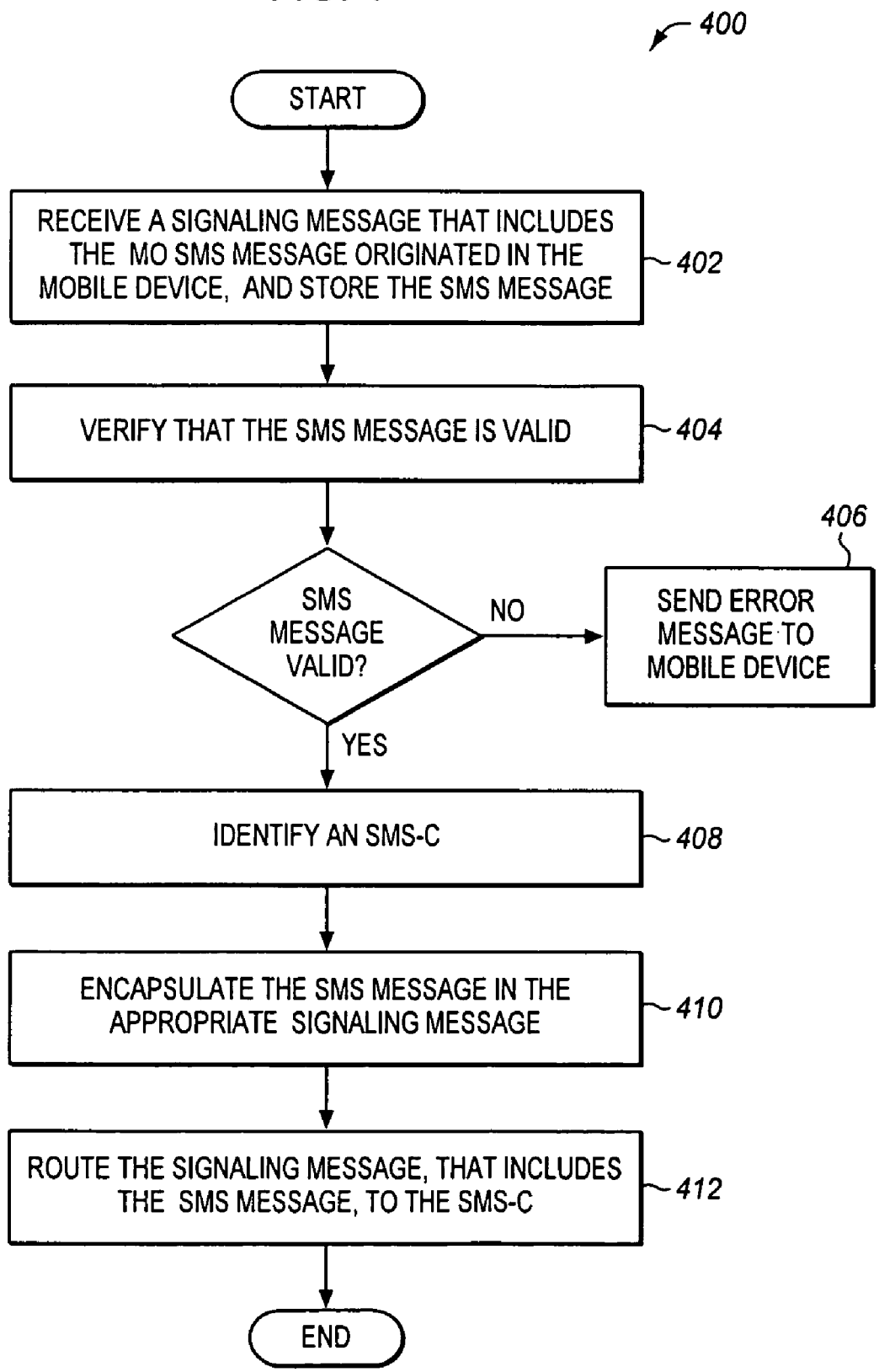

FIGS. 3-4 are flow charts illustrating a method 300 of delivering a Mobile Originated (MO) SMS message in an exemplary embodiment. The steps of method 300 will be described with reference to exemplary communication network 100 in FIG. 1 and exemplary BMGW 122 in FIG. 2, but those skilled in the art will appreciate that method 300 may be performed in other networks and systems. Also, the steps of the flow charts in FIGS. 3-4 are not all inclusive and other steps, not shown, may be included. Further, the steps may be performed in an alternative order.

FIG. 3 illustrates the steps of method 300 performed in mobile device 130 for delivering the MO SMS message. In step 302, mobile device 130 identifies an SMS message for delivery (see also FIG. 1). The SMS message may be created by a user of mobile device 130, or may be an existing SMS message that is being re-sent or forwarded. In step 304, mobile device 130 determines whether to send the SMS message to voice network 102 or broadband data network 104. Because mobile device 130 has dual mode capabilities, mobile device 130 is able to send the SMS message to either voice network 102 or broadband data network 104. In making the determination of step 304, mobile device 130 may identify where it is presently registered. For example, if mobile device 130 is presently registered only in voice network 102, then mobile device 130 may make a determination to send the SMS message to voice network 102. If mobile device 130 is presently registered only in broadband data network 104, then mobile device 130 may make a determination to send the SMS message to broadband data network 104.

If mobile device 130 is registered in both networks 102 and 104, then mobile device 130 may process policies or criteria to make the determination of where to send the SMS message. The criteria may define that a default is to send the SMS message to broadband data network 104, and then fail over to voice network 102. The criteria may define that mobile device 130 sends the SMS message over broadband data network 104 during peak hours, and sends the SMS message over voice network 102 during non-peak hours. The criteria may define that mobile device 130 checks the availability of BMGW 122 (or other BMGWs in broadband data network 104), such as by querying a DNS (not shown in FIG. 1). Mobile device 130 may, for example, send the SMS message to the nearest BMGW in broadband data network 104. If no BMGW 122 is available or if no nearby BMGW 122 is available, then mobile device 130 will fail over to voice network 102. For example, if mobile device 130 is located in the east coast but all east coast BMGWs are down, then mobile device 130 will not try a BMGW in west coast but will send the SMS message to voice network 102 instead.

If the determination in step 304 is to send the SMS message to broadband data network 104, then mobile device 130 encapsulates the SMS message in the appropriate signaling message for broadband data network 104 in step 306. For example, mobile device 130 may encapsulate the SMS message in a SIP MESSAGE or a SIP INVITE. Mobile device 130 then sends the signaling message, which includes the SMS message, to broadband data network 104 in step 308. Mobile device 130 may be provisioned with the domain address of BMGW 122 so that mobile device 130 may send the signaling message directly to BMGW 122. Those skilled in the art will appreciate that steps 306 and 308 may be broadly described as sending the MO SMS message to broadband data network 104.

If the determination in step 304 is to send the SMS message to voice network 102, then mobile device 130 encapsulates the SMS message in the appropriate signaling message for voice network 102 in step 310. For example, mobile device 130 may encapsulate the SMS message in an SS7 message. Mobile device 130 then sends the signaling message, which includes the SMS message, to voice network in step 312.

Assume for the next embodiment that mobile device 130 sends the MO SMS message to broadband data network 104. FIG. 4 illustrates the steps of method 300 performed in BMGW 122 for delivering the MO SMS message. In step 402, interface 202 of BMGW 122 receives the signaling message that includes the SMS message, and stores the SMS message (see also FIG. 2). Message processor 204 then processes the header of the SMS message to identify session information included in the header, such as a MIP address, an MDN, etc. In step 404, message processor 204 verifies that the SMS message is valid. Message processor 204 may verify that the SMS message is valid by comparing information in the header of the SMS message with session information stored in session database 206. For example, message processor 204 may compare the MIP address of the SMS message with the MIP address of the mobile device 130 stored in the session database 206. Message processor 204 may compare the MDN of the SMS message with the MDN of the mobile device 130 stored in the session database 206. Message processor 204 may compare a session setup timestamp in the SMS message with the session setup timestamp for the session that is stored in session database 206. Message processor 204 may also determine if data is missing or incorrect in the header of the SMS message.

If the SMS message is invalid, then message processor 204 sends an error message to mobile device 130 in step 406. If the SMS message is valid, then message processor 204 identifies an SMS-C for the SMS message in step 408. This SMS-C may be SMS-C 106 as illustrated in FIG. 1 or another SMS-C not shown in FIG. 1. In one example, message processor 204 may identify the SMS-C 106 based on a pre-defined routing table. BMGW 122 may be provisioned with an MDN routing table, and thus is able to identify the SMS-C 106 based on the MDN of mobile device 130 or the destination, and the routing table. In another example, message processor 204 may identify SMS-C 106 based on a subscriber profile for the user of mobile device 130. Thus, message processor 204 may route the SMS message to the SMS-C 106 of different networks based on the subscriber profile, such networks including CDMA, GSM, UMTS, and IMS networks.

After identifying the appropriate SMS-C 106, message processor 204 encapsulates the SMS message in the appropriate signaling message in step 410. The type signaling message used for the SMS message depends on the type of network the SMS-C 106 is implemented in. For example, if SMS-C 106 is implemented in a GSM network, then message processor 204 encapsulates the SMS message in an SS7 message. If SMS-C 106 is implemented in an IMS network, then message processor 204 encapsulates the SMS message in a SIP message. In step 412, message processor 204 routes the signaling message, which includes the SMS message, to the SMS-C 106 through interface 202.

Referring back to FIG. 1, SMS-C 106 receives the MO SMS message from BMGW 122. SMS-C 106 then stores the SMS message and attempts to forward the SMS message to its destination based on the SMS protocol.

Figure 5:
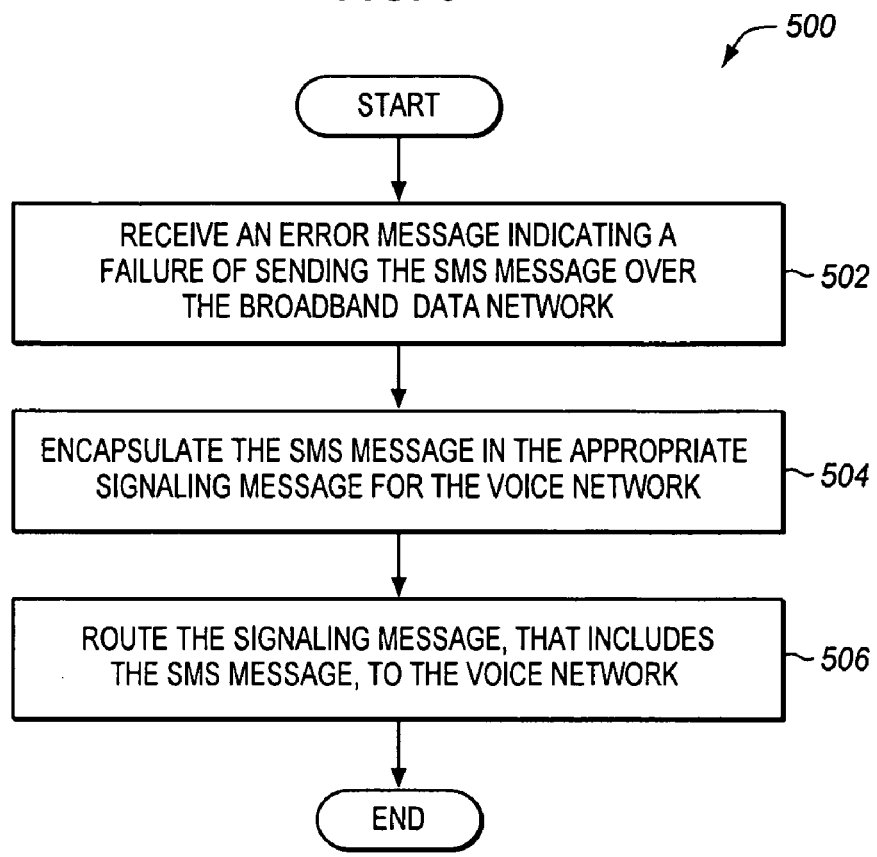
FIG. 5 is a flow chart illustrating a method of handling a failover within a mobile device in an exemplary embodiment.

In the event that the SMS message is not valid and message processor 204 sends an error message to mobile device 130 in step 406, voice network 102 may be used as a fail over to deliver the SMS message. FIG. 5 is a flow chart illustrating a method 500 of handling a failover within mobile device 130 in an exemplary embodiment. In step 502, mobile device 130 receives the error message from BMGW 122. The error message may be sent for a variety of reasons, one of which is that the SMS message was not valid. In step 504, mobile device 130 encapsulates the SMS message in the appropriate signaling message for voice network 102. For example, if voice network 102 comprises a GSM network, then mobile device 130 may encapsulate the SMS message in an SS7 message. Mobile device 130 then routes the signaling message, which includes the SMS message, to voice network 102 in step 506.

As an alternative, mobile device 130 may try to send the SMS message to broadband data network 104 again in response to the error message. If an error message is once again received from broadband data network 104, then mobile device 130 may retry the SMS message a threshold number of times. If the threshold number of attempts are unsuccessful, then mobile device 130 may fail over to voice network 102, which is indicated in steps 504 and 506.

Figure 6:
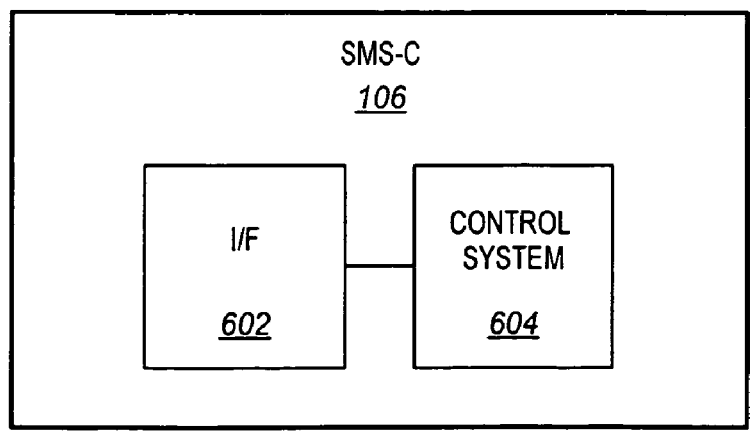
FIG. 6 illustrates an SMS-C in an exemplary embodiment.

The following embodiment illustrates a Mobile Terminated (MT) SMS scenario. An MT SMS message, which is destined for mobile device 130, is handled by SMS-C 106. FIG. 6 illustrates SMS-C 106 in an exemplary embodiment. In this embodiment, SMS-C 106 includes an interface 602 and a control system 604. Interface 602 comprises any device, component, or system configured to transmit and receive signaling messages that include SMS messages. For example, interface 602 may be able to transmit and receive SIP messages, SS7 messages, etc. Control system 604 comprises any device, component, or system configured to process signaling messages and/or SMS messages based on a store-and-forward mechanism, such as according to SMS protocol.

Figure 7:
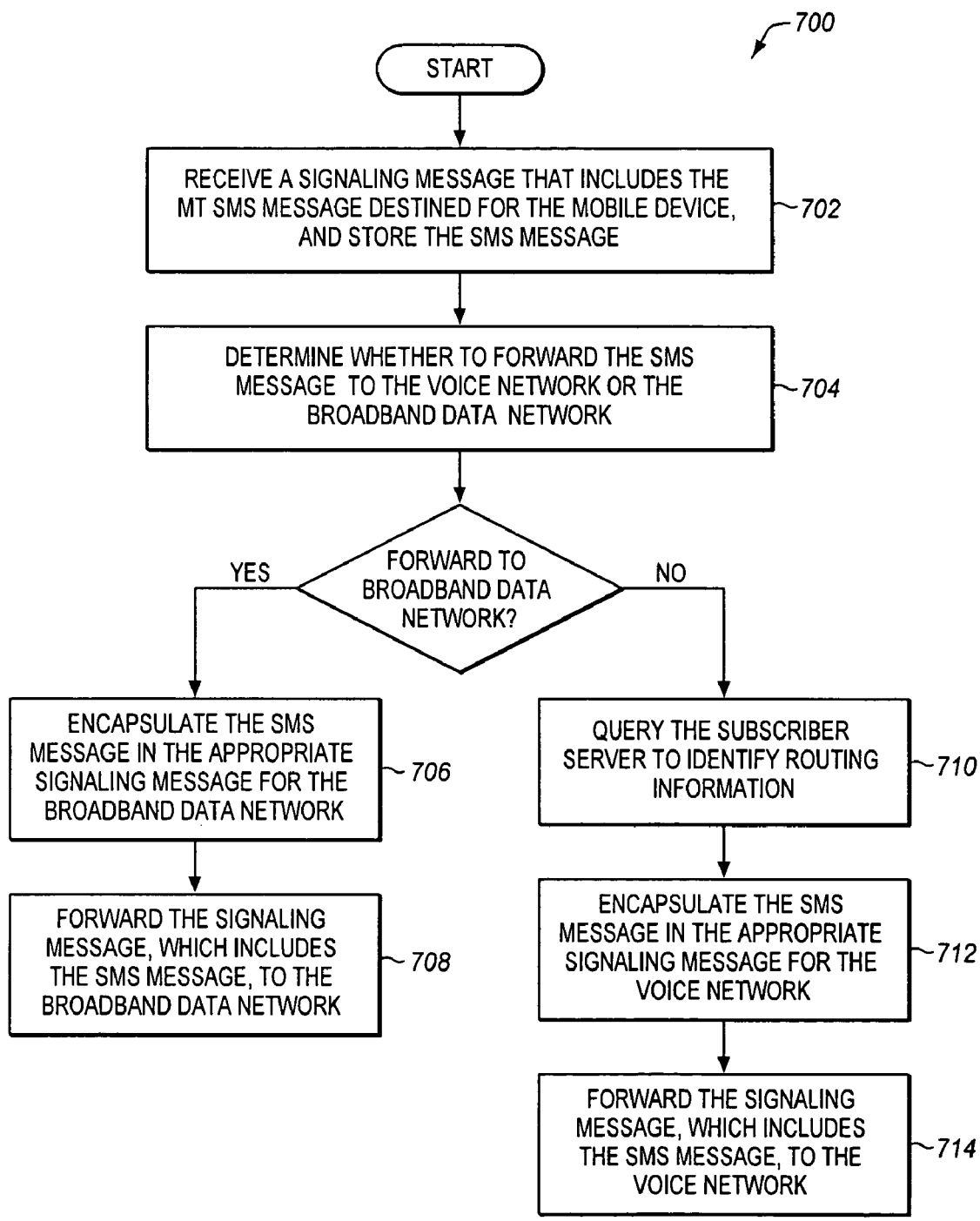
FIGS. 7-8 are flow charts illustrating a method of delivering a Mobile Terminated (MT) SMS message in an exemplary embodiment.
Figure 8:
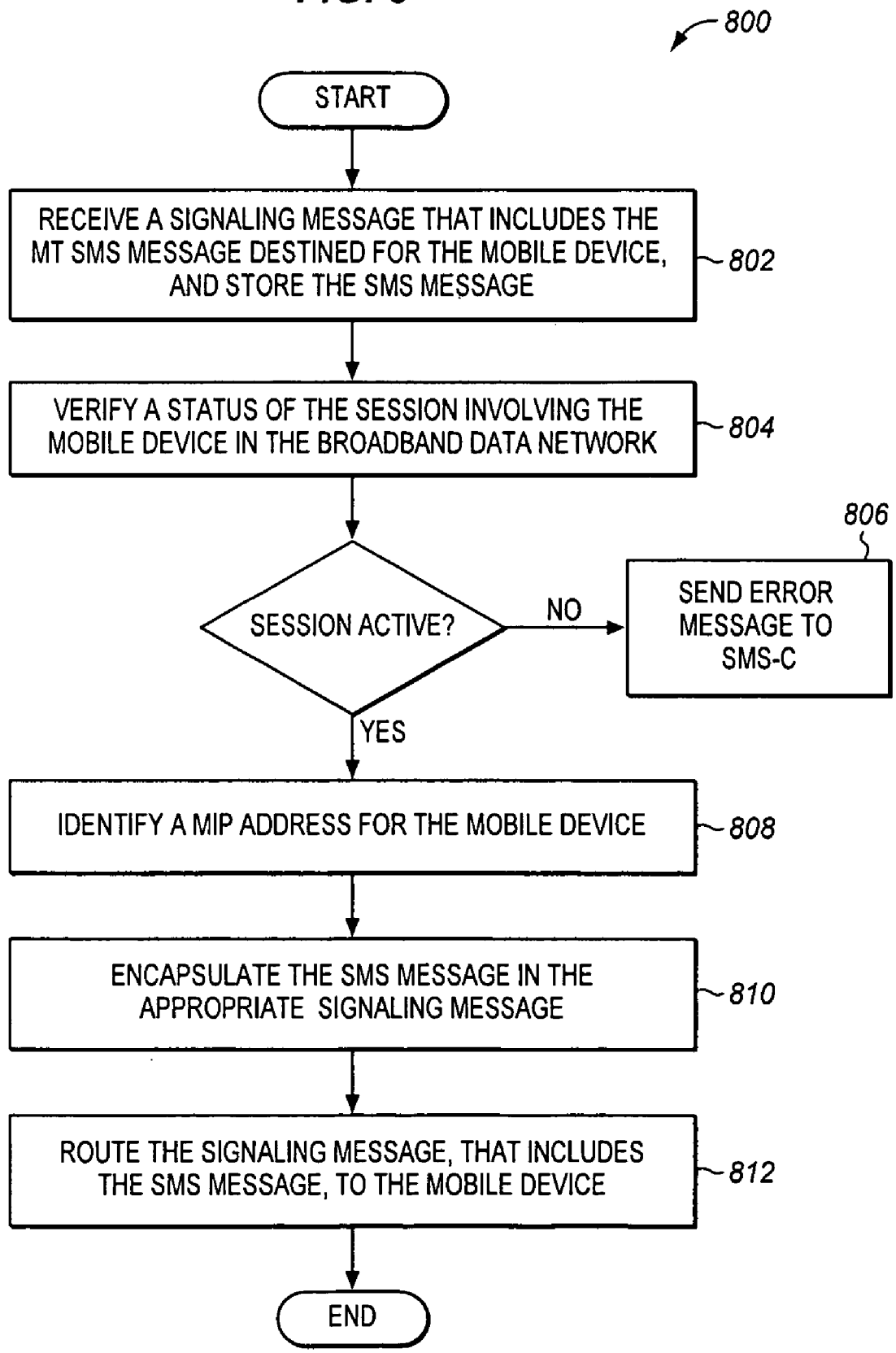

FIGS. 7-8 are flow charts illustrating a method 700 of delivering a Mobile Terminated (MT) SMS message in an exemplary embodiment. The steps of method 700 will be described with reference to exemplary communication network 100 in FIG. 1, exemplary BMGW 122 in FIG. 2, and exemplary SMS-C 106 in FIG. 6, but those skilled in the art will appreciate that method 700 may be performed in other networks or systems. Also, the steps of the flow charts in FIGS. 7-8 are not all inclusive and other steps, not shown, may be included. Further, the steps may be performed in an alternative order.

FIG. 7 illustrates the steps of method 700 performed in SMS-C 106 for delivering the MT SMS message. In step 702, interface 602 in SMS-C 106 receives a signaling message (or possibly a bearer traffic message) from an originator (not shown) that includes an SMS message destined for mobile device 130. Control system 604 stores the SMS message in step 702 using the store-and-forward mechanism defined by the SMS protocol. In step 704, control system 604 determines whether to forward the SMS message to voice network 102 or broadband data network 104. In making the determination of step 704, control system 604 may identify where mobile device 130 is presently registered. If mobile device 130 is presently registered only in voice network 102, then control system 604 may make a determination to forward the SMS message to voice network 102. If mobile device 130 is presently registered only in broadband data network 104, then control system 604 may make a determination to forward the SMS message to broadband data network 104.

If mobile device 130 is registered in both networks 102 and 104, then control system 604 may process policies or criteria to make the determination of where to forward the SMS message. The criteria may define that a default is to forward the SMS message to broadband data network 104 if mobile device 130 has dual mode capabilities or broadband data capabilities, and then fail over to voice network 102. Thus, control system 604 may first determine whether mobile device 130 has broadband data capabilities. For example, control system 604 may store a subscriber profile for the user of mobile device 130 which indicates whether mobile device 130 has broadband data capabilities, such as EVDO capabilities. The criteria may define that SMS-C 106 forwards the SMS message to broadband data network 104 during peak hours, and forwards the SMS message to voice network 102 during non-peak hours. The criteria may define that SMS-C 106 checks the availability of BMGW 122 (or other BMGWs in broadband data network 104), such as by transmitting a heartbeat message (such as a SIP OPTION) to BMGW 122. SMS-C 106 may send the SMS message to the nearest BMGW in broadband data network 104. If no BMGW 122 is available or if no nearby BMGW 122 is available, then SMS-C 106 will fail over to voice network 102. Criteria that establish a distance range for an acceptable BMGW may also be consulted. For example, if SMS-C 106 is located in the east coast but all east coast BMGWs are down, then SMS-C 106 will not try a BMGW in west coast but will send the SMS message to voice network 102 instead.

If the determination in step 704 is to forward the SMS message to broadband data network 104, then control system 604 encapsulates the SMS message in the appropriate signaling message for broadband data network 104 in step 706, such as a SIP MESSAGE or a SIP INVITE. In step 708, control system 604 forwards the signaling message, which includes the SMS message, to broadband data network 104 through interface 602. It should be noted that SMS-C 106 is able to forward the SMS message to broadband data network 104 without a specific query to subscriber server 114 to obtain routing information. SMS-C 106 may be provisioned with one or more addresses for BMGW 122. When control system 604 determines that the SMS message should be forwarded to broadband data network 104, control system 604 identifies the pre-provisioned address for BMGW 122, and forwards the signaling message to the address of BMGW 122 without having to query subscriber server 114.

If the determination in step 704 is to forward the SMS message to voice network 102, then control system 604 queries subscriber server 114 to identify routing information for mobile device 130 in step 710. In step 712, control system 604 encapsulates the SMS message in the appropriate signaling message for voice network 102, such as an SS7 message. In step 714, control system 604 forwards the signaling message, which includes the SMS message, to voice network 102 through interface 602 based on the routing information.

FIG. 8 illustrates the steps of method 700 performed in BMGW 122 for delivering the MT SMS message. In step 802, interface 202 in BMGW 122 receives the signaling message that includes the SMS message destined for mobile device 130. Also in step 802, message processor 204 stores the SMS message. In step 804, message processor 204 verifies a status of the session involving mobile device 130 (i.e., active or inactive) in broadband data network 104. For example, message processor 204 may look up a session status in session database 206 based on the MIP address or the MDN. If an entry for the MIP address or MDN exists in session database 206, then message processor 204 may determine whether the session involving mobile device 130 is presently active, or whether the session involving mobile device 130 has been torn down. Message processor 204 may alternatively query subscriber server 114 in voice network 102 for the status of mobile device 130. In another alternative, BMGW 122 may access a centralized registration database in broadband data network 104 (not shown in FIG. 1) for the status of mobile device 130.

If the session is presently inactive (i.e., mobile device 130 is no longer registered), then message processor 204 sends an error message to SMS-C 106 in step 806 through interface 202. If the session is presently active (i.e., mobile device 130 is registered), then message processor 204 identifies the MIP address for mobile device 130 based on the MDN in the SMS message in step 808. For example, message processor 204 may search session database 206 based on the MDN included in the SMS message to identify the MIP address stored for mobile device 130. Message processor 204 then encapsulates the SMS message in the appropriate signaling message in step 810. In step 812, message processor 204 routes the signaling message, which includes the SMS message, to mobile device 130 through interface 202. For example, message processor 204 may send a SIP MESSAGE, which includes the SMS message, to the MIP address of mobile device 130. If a MIP address is not found for mobile device 130, then message processor 204 may send an error message to SMS-C 106 through interface 202.

Figure 9:
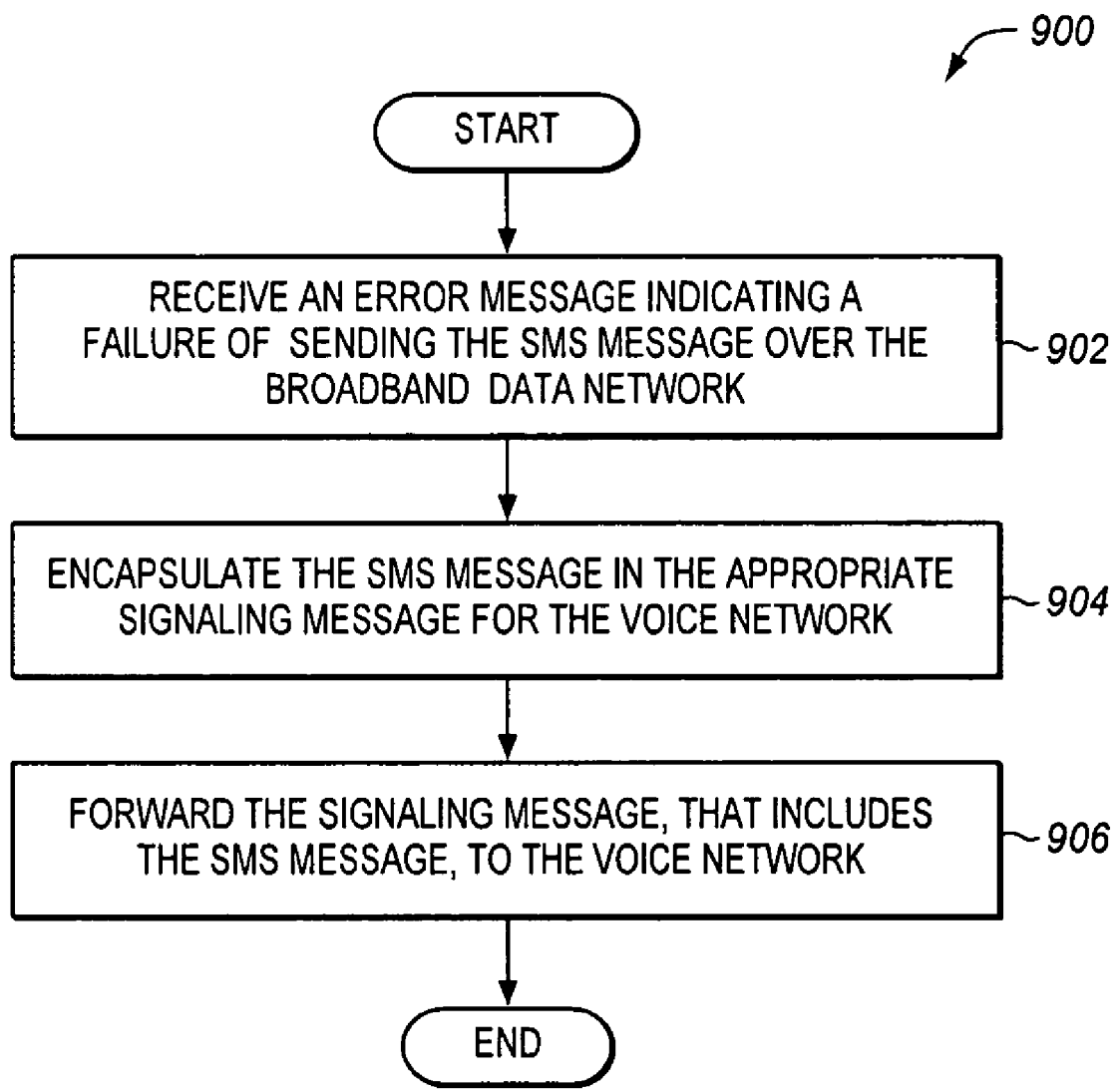
FIG. 9 is a flow chart illustrating a method of handling a failover within an SMS-C in an exemplary embodiment.

There may be instances where the SMS message cannot be delivered over broadband data network 104. For instance, control system 604 in SMS-C 106 may determine that mobile device 130 does not have broadband capabilities. In another instance, control system 604 may forward the SMS message to BMGW 122, but BMGW 122 is not able to identify a MIP address for mobile device 130. Control system 604 may thus receive an error message from BMGW 122 through interface 602. In any event, if an attempt to deliver the SMS message over broadband data network 104 fails, then voice network 102 may be used as a fail over to deliver the SMS message. FIG. 9 is a flow chart illustrating a method 900 of handling a failover within SMS-C 106 in an exemplary embodiment. In step 902, control system 604 receives the error message from BMGW 122 through interface 602 or otherwise determines that the SMS message cannot be delivered over broadband data network 104. In step 904, control system 604 encapsulates the SMS message in the appropriate signaling message for voice network 102. For example, if voice network 102 comprises a GSM network, then control system 604 may encapsulate the SMS message in an SS7 message. Control system 604 then forwards the signaling message, which includes the SMS message, to voice network 102 in step 906 through interface 602.

As described in the above embodiments, SMS traffic is advantageously offloaded from voice network 102 to broadband data network 104. The offload of SMS traffic from voice network 102 advantageously avoids congestion on the signaling channels of voice network 102. Also, SMS-C 106 does not need to query subscriber server 114 each time it receives an SMS message. SMS-C 106 may be provisioned with an address for BMGW 122, and forward the SMS messages to that address without querying subscriber server 114. This further reduces message traffic in voice network 102. With the reduced traffic, voice network 102 can maintain lower call setup times.

EXAMPLE

Figure 10:
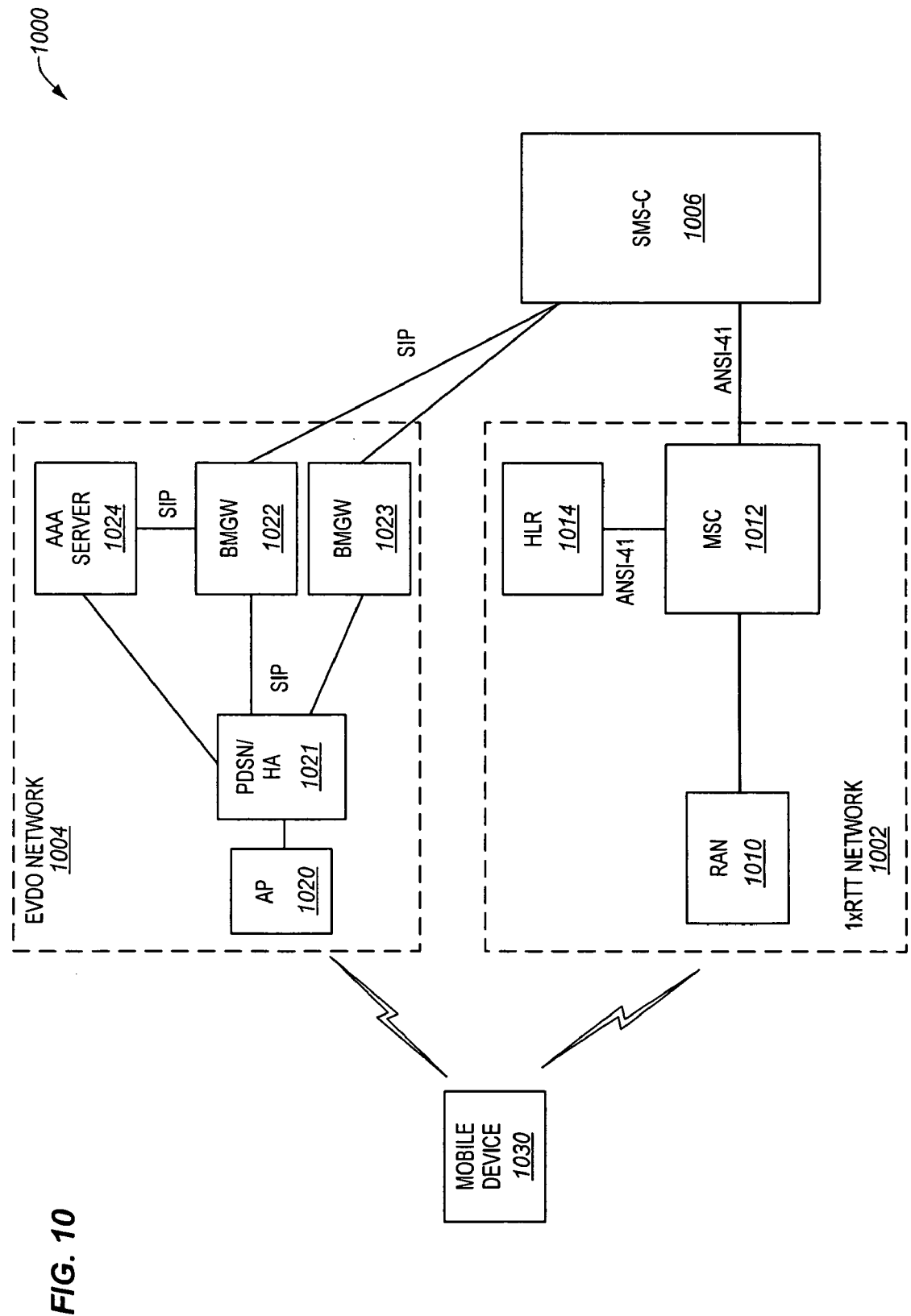
FIG. 10 illustrates another communication network in an exemplary embodiment.

FIG. 10 illustrates another communication network 1000 in an exemplary embodiment. Communication network 1000 includes a single carrier Radio Transmission Technology (1xRTT) network 1002, an EVDO network 1004, and an SMS-C 1006. 1xRTT network 1002 and EVDO network 1004 are both operable to provide communication services to a dual mode mobile device 1030. Communication network 1000 may include other networks, systems, or devices not shown in FIG. 10.

The illustrated 1xRTT network 1002 is a voice network that provides voice communications to mobile devices via wireless signals. 1xRTT network 1002 includes a RAN 1010, a Mobile Switching Center (MSC) 1012, and an HLR 1014. EVDO network 1004 comprises a broadband data network that provides data communications to mobile devices via wireless signals. The illustrated EVDO network 1004 includes an access point (AP) 1020, a Packet Data Serving Node (PDSN)/Home Agent (HA) 1021, a plurality of broadband messaging gateways (BMGW) 1022-1023, and a AAA server 1024.

Mobile device 1030 comprises any device operable to communicate via wireless signals, such as a mobile phone, a PDA, a mobile VoIP phone, etc. Mobile device 1030 is a dual mode device in this embodiment, meaning that mobile device 1030 is able to register and communicate with 1 xRTT network 1002 and EVDO network 1004 that utilize different wireless protocols.

Figure 11:
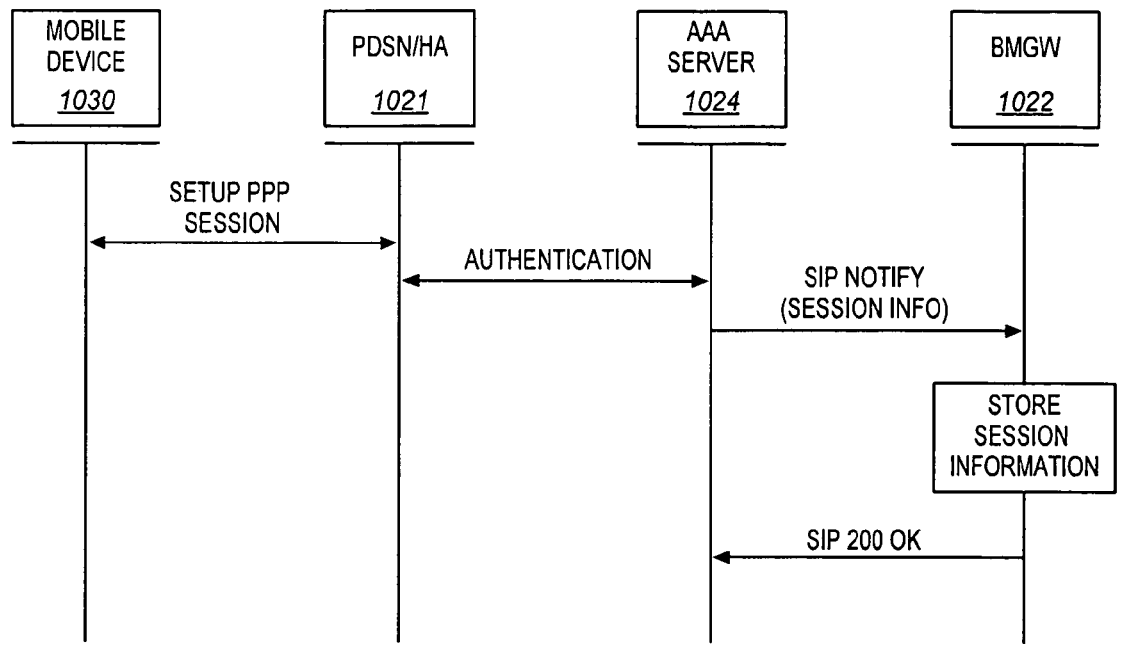
FIG. 11 is a message diagram illustrating a successful registration of a mobile device in an exemplary embodiment.

Before mobile device 1030 is able to send or receive SMS messages over EVDO network 1004, mobile device 1030 first registers with EVDO network 1004. FIG. 11 is a message diagram illustrating a successful registration of mobile device 1030 in an exemplary embodiment. Mobile device 1030 exchanges messages with PDSN/HA 1021 to set up a PPP session in EVDO network 1004. As part of setting up the PPP session, PDSN/HA 1021 transmits an authentication request to AAA server 1024. The authentication request may include, among other session information, an MDN, an HA address, a MIP address, and a session setup timestamp. When the session is established, AAA server 1024 is programmed to notify BMGW 1022 (and BMGW 1023) of the session information for mobile device 1030. Thus, AAA server 1024 generates a SIP NOTIFY and inserts the session information in the SIP NOTIFY. The session information may include an MDN, an HA address, a MIP address, and a session setup timestamp. AAA server 1024 then transmits the SIP NOTIFY to BMGW 1022.

BMGW 1022 processes the SIP NOTIFY to identify the inserted session information. If session information in the SIP NOTIFY is complete, then BMGW 1022 stores the session information for mobile device 1030, such as in a session database (see FIG. 2). For example, BMGW 1022 may store the MDN of mobile device 1030 with the MIP address and the HA address mapped to the MDN. BMGW 1022 may also store the session setup timestamp and some indicator that the session is presently active. BMGW 1022 then responds to AAA server 1024 with a SIP 200 OK.

Figure 12:
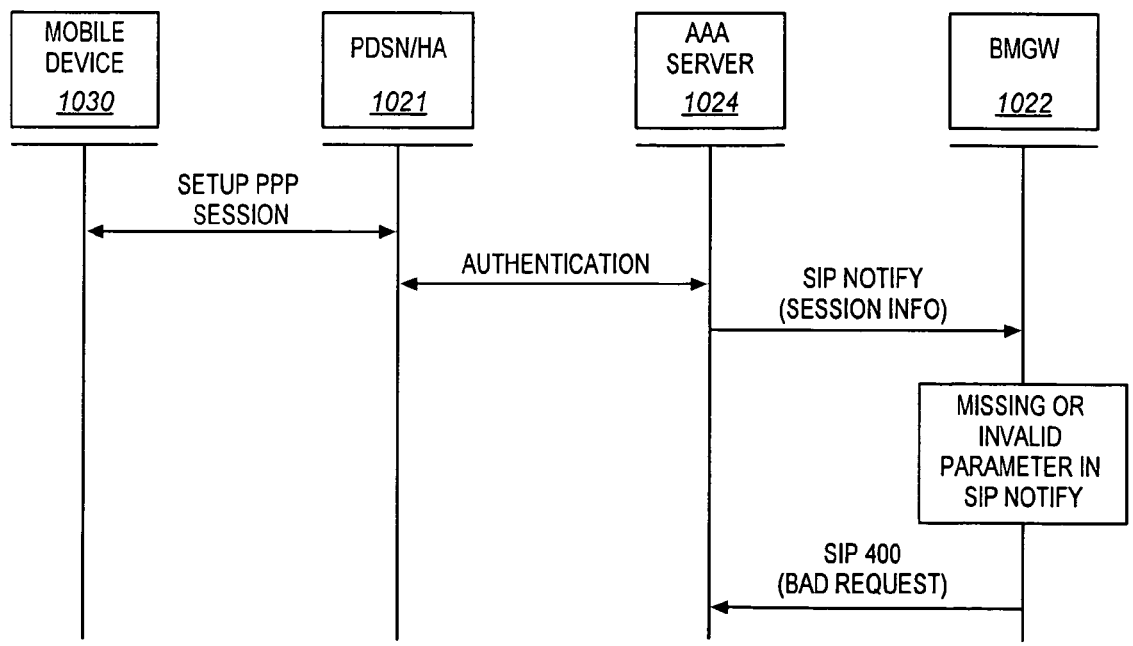
FIG. 12 is a message diagram illustrating an unsuccessful registration of a mobile device in an exemplary embodiment.

If some of the session information included in the SIP NOTIFY is missing or incorrect, then BMGW 1022 will inform AAA server 1024. FIG. 12 is a message diagram illustrating an unsuccessful registration of mobile device 1030 in an exemplary embodiment. The flow in FIG. 12 is similar to that of FIG. 11, except that the SIP NOTIFY has a missing or invalid parameter. Thus, BMGW 1022 rejects the notification and sends a SIP 400 (Bad Request) to AAA server 1024.

While the PPP session is active, AAA server 1024 may periodically send SIP NOTIFY's to BMGW 1022 (and BMGW 1023). In response to the periodic SIP NOTIFY's, BMGW 1022 updates the session information stored for mobile device 1030. A similar process is used to update the session information for other mobile devices.

Figure 13:
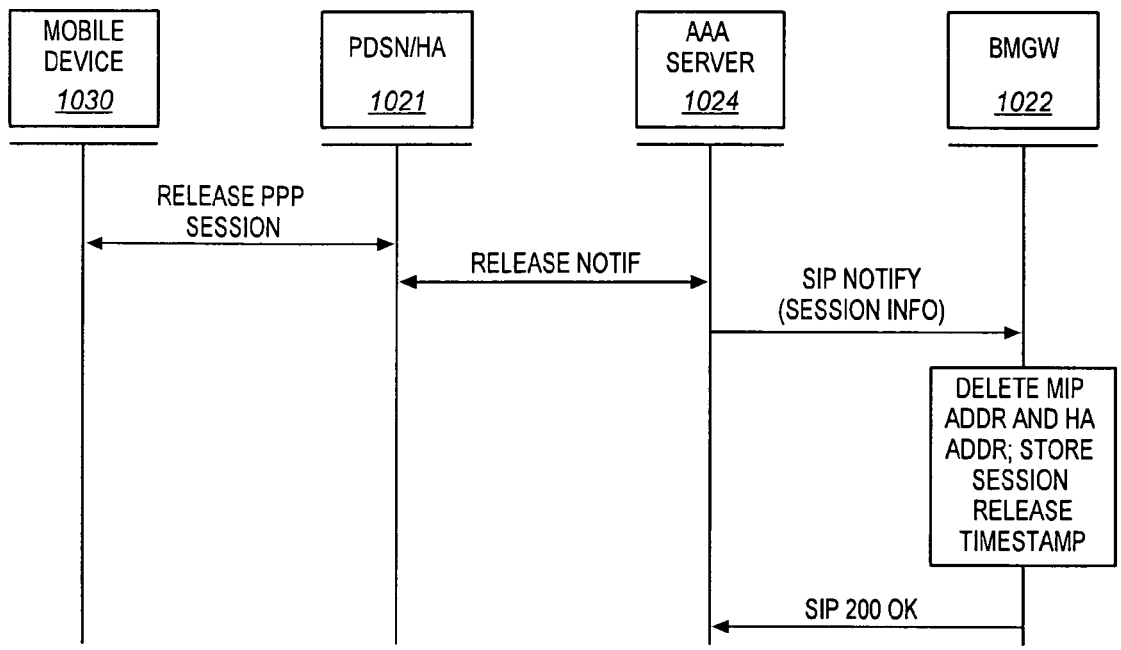
FIG. 13 is a message diagram illustrating a successful deregistration of a mobile device in an exemplary embodiment.

If the session involving mobile device 1030 is torn down, then AAA server 1024 also notifies BMGW 1022 of this event. The session involving mobile device 1030 may be torn down for a variety of reasons, such as mobile device 1030 being powered off, traveling out of the service area of EVDO network 1004, etc. FIG. 13 is a message diagram illustrating a successful deregistration of mobile device 1030 in an exemplary embodiment. Mobile device 1030 exchanges messages with PDSN/HA 1021 to release or tear down the PPP session in EVDO network 1004. As part of releasing the PPP session, PDSN/HA 1021 transmits a release notification message to AAA server 1024. The release notification message request may include, among other session information, an MDN, a release indicator, and a session release timestamp. When the session is released, AAA server 1024 is programmed to notify BMGW 1022 (and BMGW 1023) of the session information for mobile device 1030. Thus, AAA server 1024 generates a SIP NOTIFY and inserts the session information in the SIP NOTIFY. The session information may include an MDN, an HA address, a MIP address, and a session release timestamp. AAA server 1024 then transmits the SIP NOTIFY to BMGW 1022 with the session information.

BMGW 1022 then processes the SIP NOTIFY to identify the inserted session information. If session information in the SIP NOTIFY is complete, then BMGW 1022 deletes the MIP address and the HA address that are mapped to the MDN for mobile device 1030. BMGW 1022 may also store the session release timestamp and some indicator that the session is presently inactive. BMGW 1022 then responds to AAA server 1024 with a SIP 200 OK.

Figure 14:
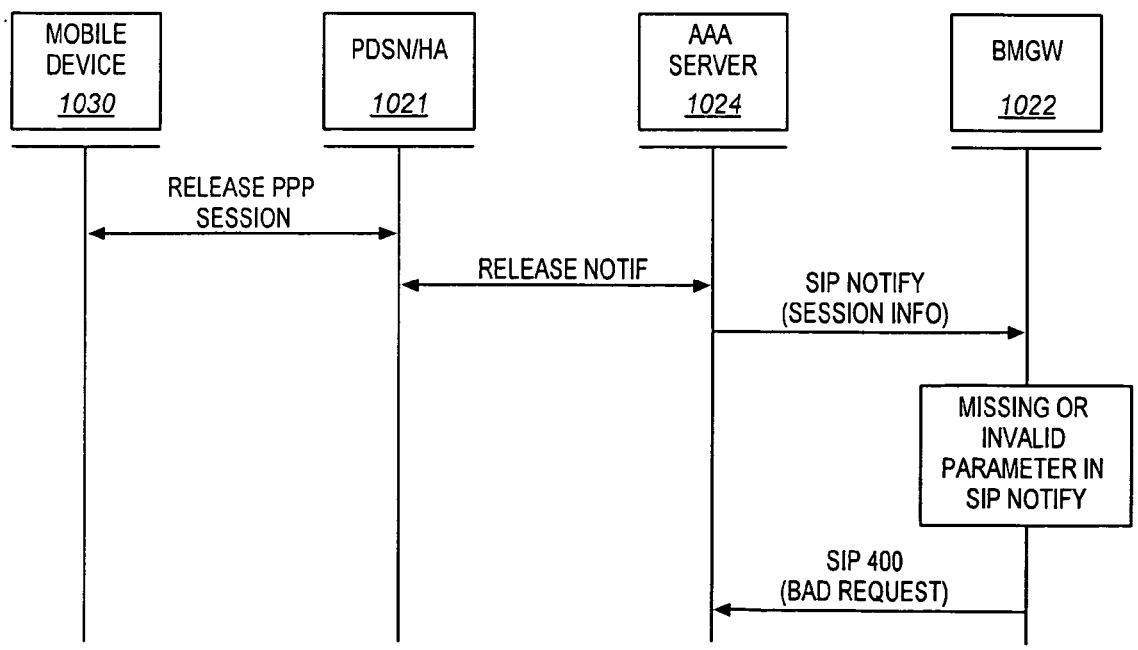
FIG. 14 is a message diagram illustrating an unsuccessful deregistration of a mobile device in an exemplary embodiment.

If some of the session information included in the SIP NOTIFY is missing or incorrect, then BMGW 1022 will inform AAA server 1024. FIG. 14 is a message diagram illustrating an unsuccessful deregistration of mobile device 1030 in an exemplary embodiment. The flow in FIG. 14 is similar to that of FIG. 13, except that the SIP NOTIFY has a missing or invalid parameter. Thus, BMGW 1022 rejects the deregistration and sends a SIP 400 (Bad Request) to AAA server 1024.

Figure 15:
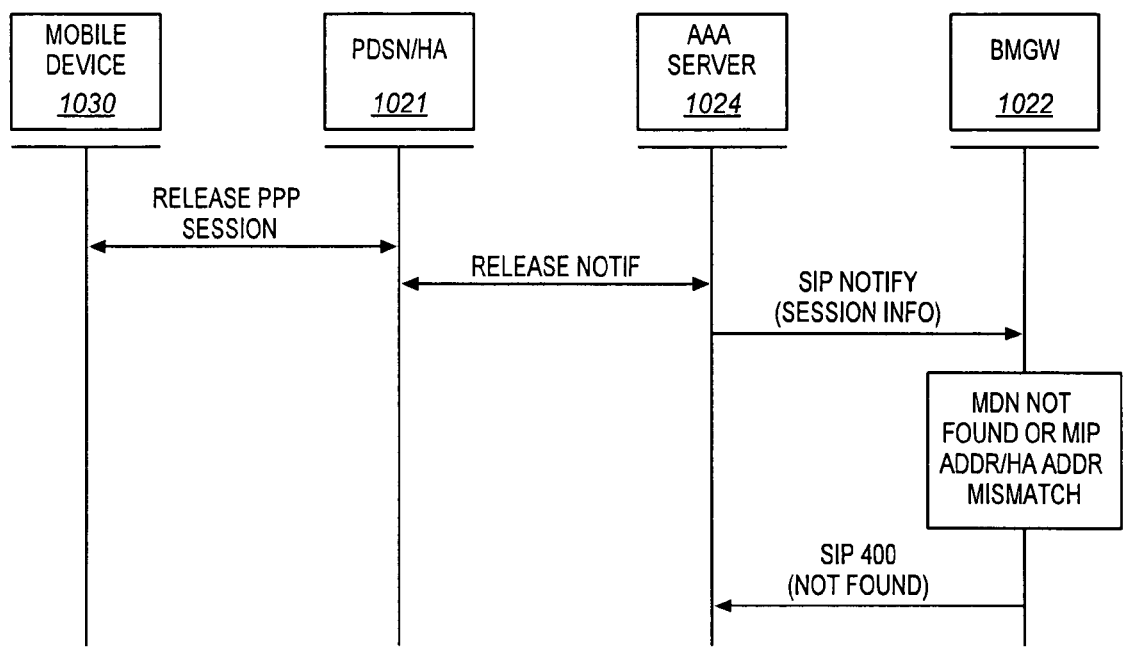
FIG. 15 is a message diagram illustrating another unsuccessful deregistration of a mobile device in an exemplary embodiment.

If the MDN in the SIP NOTIFY is not found or if there is a mismatch between the MDN and the MIP address/HA address, then BMGW 1022 will again inform AAA server 1024. FIG. 15 is a message diagram illustrating another unsuccessful deregistration of mobile device 1030 in an exemplary embodiment. The flow in FIG. 15 is similar to that of FIG. 14, except that some session information in the SIP NOTIFY does not match stored information for the session. Thus, BMGW 1022 rejects the deregistration and sends a SIP 400 (Not Found) to AAA server 1024.

Through the SIP NOTIFY'S provided by AAA server 1024, BMGW 1022 and BMGW 1023 are able to store updated session information on mobile device 1030 and other mobile devices. Using the session information, BMGW 1022 and BMGW 1023 are able to handle SMS messages sent over EVDO network 1004, which is described below.

Figure 16:
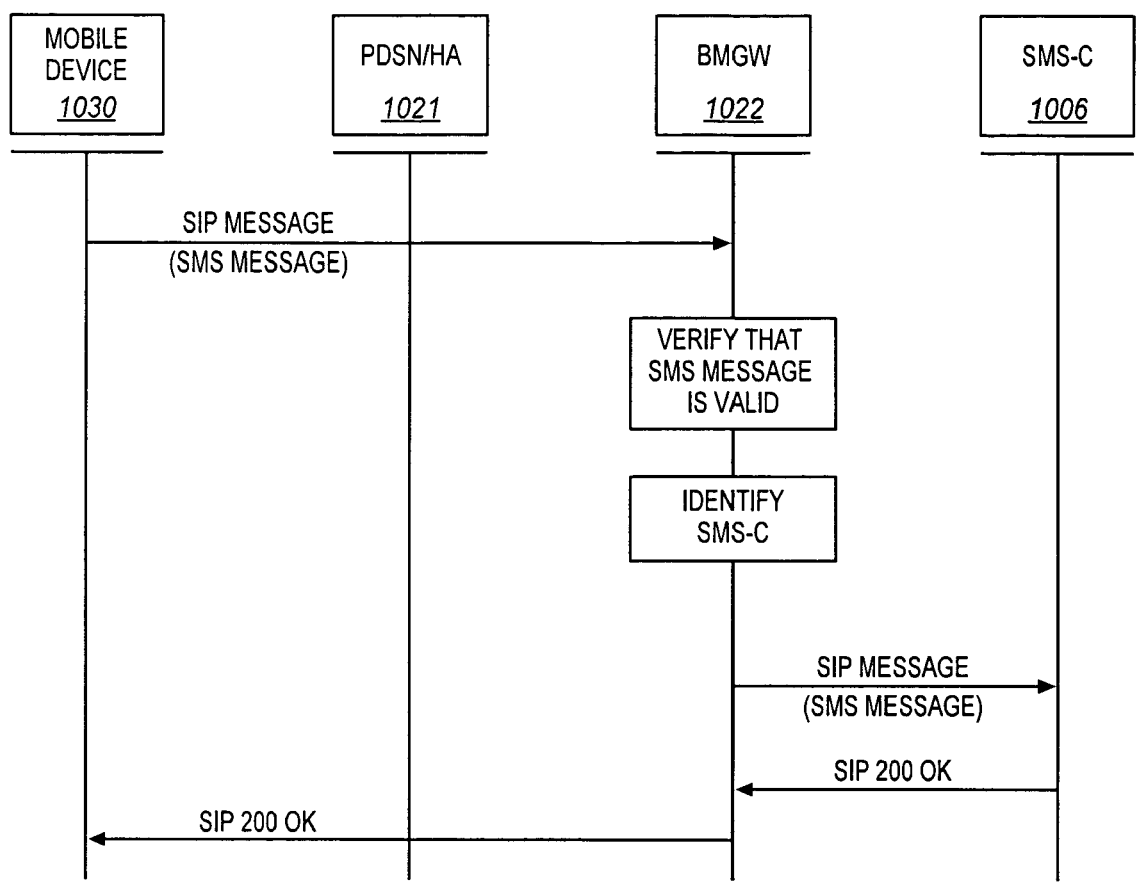
FIG. 16 is a message diagram illustrating a successful delivery of an MO SMS message over an EVDO network in an exemplary embodiment.

FIG. 16 is a message diagram illustrating a successful delivery of an MO SMS message over EVDO network 1004 in an exemplary embodiment. To start, mobile device 1030 identifies an MO SMS message, and encapsulates the SMS message in a SIP MESSAGE. Mobile device 1030 then sends the SIP MESSAGE to BMGW 1022 through AP 1020 and PDSN/HA 1021. In response to the SIP MESSAGE, BMGW 1022 verifies that the MO SMS message is valid by comparing information in a header of the MO SMS message with the stored session information. If the SMS message is valid, then BMGW 1022 identifies the SMS-C 1006 for the destination of the MO SMS message. To do so, BMGW 1022 may identify the digits in the "TO" header of the SMS message, and enter these digits into a pre-defined routing table. This routing table will indicate the proper SMS-C for the SMS message based on the digits in the "TO" header. BMGW 1022 then routes the SIP MESSAGE, which includes the MO SMS message, to the identified SMS-C 1006. SMS-C 1006 then responds back to BMGW 1022 with a SIP 200 OK, and BMGW 1022 responds back to mobile device 1030 with a SIP 200 OK. SMS-C 1006 may then forward the MO SMS message to the destination according to SMS protocol.

Figure 17:
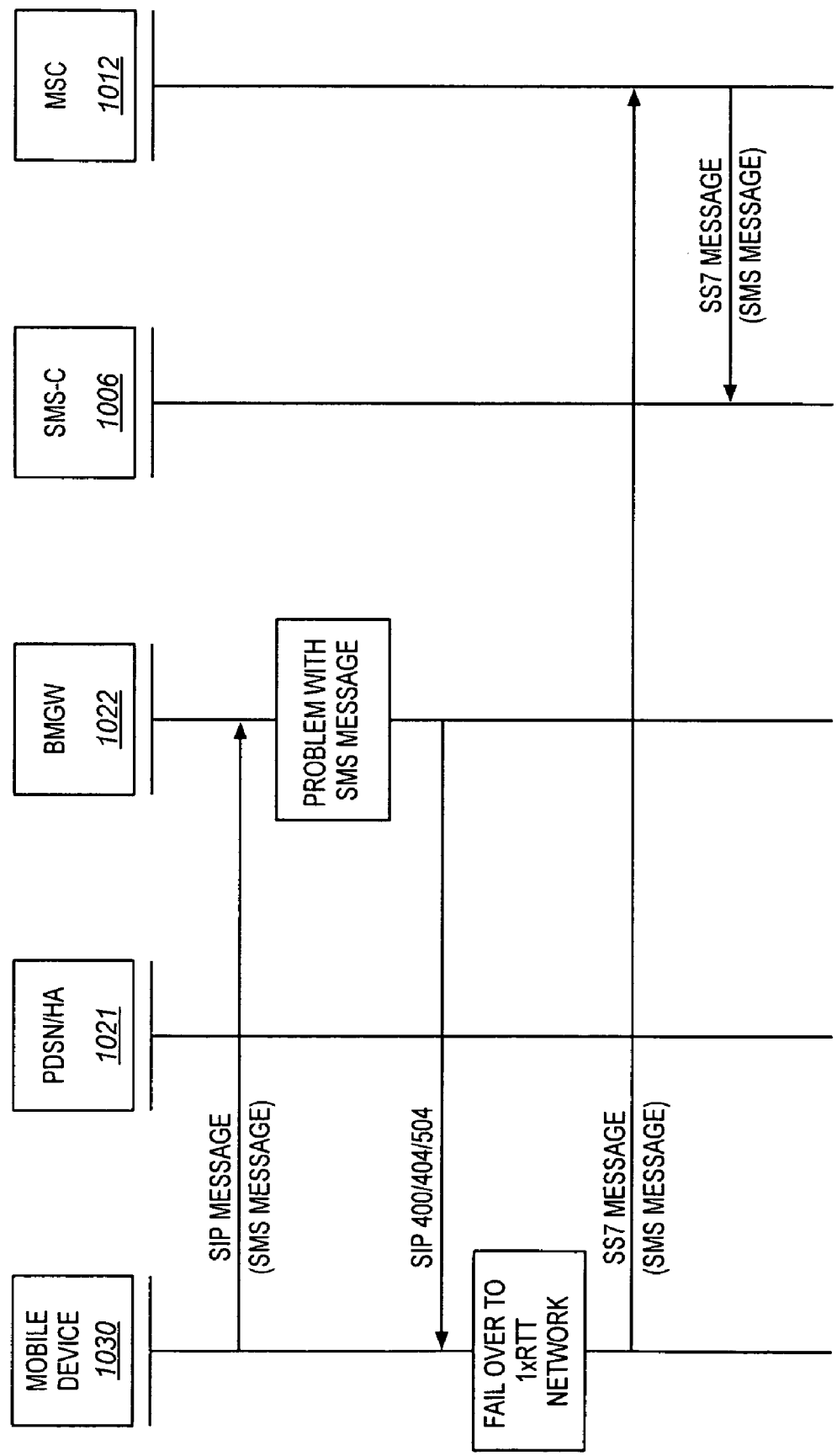
FIG. 17 is a message diagram illustrating an unsuccessful delivery of an MO SMS message over an EVDO network in an exemplary embodiment.

There may be instances where there is a problem delivering the SMS message over EVDO network 1004. For example, some of the session information included in the SIP MESSAGE may be missing or incorrect. Or, the SMS message may be not valid because the MIP address in the header of the SMS message may not match a MIP address stored in BMGW 1022. Or, the SMS message may time out. There may be multiple other scenarios where there is a problem delivering the SMS message. FIG. 17 is a message diagram illustrating an unsuccessful delivery of an MO SMS message over EVDO network 1004 in an exemplary embodiment. As in FIG. 16, mobile device 1030 identifies an MO SMS message, and encapsulates the SMS message in a SIP MESSAGE. Mobile device 1030 then sends the SIP MESSAGE to BMGW 1022 through AP 1020 and PDSN/HA 1021. BMGW 1022 then identifies a problem for any of a variety of reasons. Thus, BMGW 1022 sends a SIP error message back to mobile device 1030 depending on the problem. The SIP error message may comprise a SIP 400, a SIP 404, a SIP 504, or any other 4xx/5xx/6xx error message.

In response to the SIP error message, mobile device 1030 is programmed to fail over to 1xRTT network 1002. Thus, mobile device 1030 encapsulates the MO SMS message in an SS7 message, which is the signaling protocol used in 1xRTT network 1002. Mobile device 1030 then routes the SS7 message, which includes the SMS message, to MSC 1012. MSC 1012 then routes the SS7 message to SMS-C 1006. SMS-C 1006 may then forward the MO SMS message to the destination according to SMS protocol.

Figure 18:
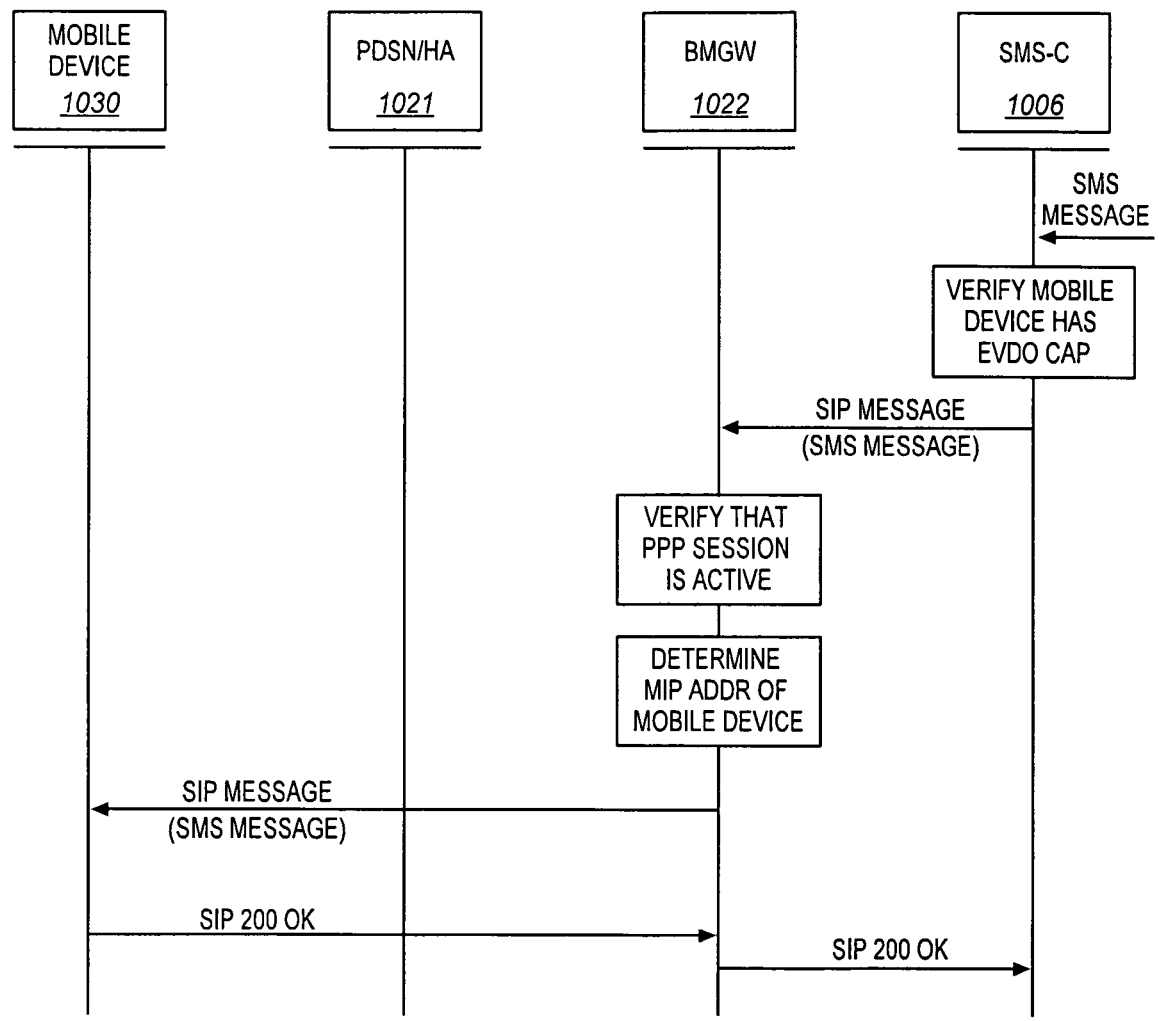
FIG. 18 is a message diagram illustrating a successful delivery of an MT SMS message over an EVDO network in an exemplary embodiment.

The following example illustrates a Mobile Terminated (MT) SMS scenario. An MT SMS message, which is destined for mobile device 1030, is handled by SMS-C 1006. FIG. 18 is a message diagram illustrating a successful delivery of an MT SMS message over EVDO network 1004 in an exemplary embodiment. Assume that an originator (not shown) sends an MT SMS message destined for mobile device 1030. The SMS message is received in SMS-C 1006, which stores the SMS message. SMS-C 1006 determines whether mobile device 1030 has EVDO capabilities. If so, SMS-C 1006 encapsulates the SMS message in a SIP MESSAGE, and forwards the SIP MESSAGE to BMGW 1022 based on a pre-provisioned address stored in SMS-C 1006.

BMGW 1022 receives the SIP MESSAGE, and verifies that the status of the data session involving mobile device 1030 is active. For instance, BMGW 1022 may identify the MDN in the header of the SMS message, and then look up the status of the PPP session in the stored session information for mobile device 1030. If the PPP session is active, then BMGW 1022 identifies a MIP address for mobile device 1030, and routes the SIP MESSAGE, which includes the MT SMS message, to mobile device 1030 based on the MIP address. Mobile device 1030 responds to BMGW 1022 with a SIP 200 OK, and BMGW 1022 sends a SIP 200 OK to SMS-C 1006, which indicates that the MT SMS message was successfully delivered.

There may be instances where there is a problem delivering the SMS message over EVDO network 1004. For example, some of the session information included in the SIP MESSAGE may be missing or incorrect. Or, the MIP address cannot be identified for the SMS message. Or, the SMS message may time out. There may be multiple other scenarios where there is a problem delivering the SMS message. FIG. 19 is a message diagram illustrating an unsuccessful delivery of an MO SMS message over EVDO network 1004 in an exemplary embodiment. As in FIG. 18, SMS-C 1006 receives the MT SMS message, and stores the SMS message. SMS-C 1006 then determines whether mobile device 1006 has EVDO capabilities. If so, SMS-C 1006 encapsulates the SMS message in a SIP MESSAGE, and forwards the SIP MESSAGE to BMGW 1022 based on a pre-provisioned address stored in SMS-C 1006. BMGW 1022 then identifies a problem for any of a variety of reasons. Thus, BMGW 1022 sends a SIP error message back to SMS-C 1006 depending on the problem. The SIP error message may comprise a SIP 400, a SIP 404, a SIP 504, or any other 4xx/5xx/6xx error message.

In response to the SIP error message, SMS-C 1006 is programmed to fail over to 1xRTT network 1002. Thus, SMS-C 1006 encapsulates the MT SMS message in an SS7 message, which is the signaling protocol used in 1xRTT network 1002. SMS-C 1006 then forwards the SS7 message, which includes the SMS message, to MSC 1012. MSC 1012 then routes the SS7 message to mobile device 1030.

There may be instances where SMS-C 1006 receives duplicate MO SMS messages. For example, assume that mobile device 1030 sends an SMS message to EVDO network 1004. If mobile device 1030 receives an error message back as the result of a SIP timeout (see FIG. 17), then mobile device 1030 will fail over by sending the SMS message to 1xRTT network 1002. Thus, SMS-C 1006 will receive the SMS message from 1xRTT network 1002. However, even though mobile device 1030 received an error message due to a SIP timeout, BMGW 1022 may still be able to route the SMS message to SMS-C 1006. Thus, SMS-C 106 will receive two copies of the same SMS message. When this scenario occurs, SMS-C 1006 may first identify that it has received a duplicate copy of an SMS message. SMS-C 1006 may then delete one of the copies of the SMS message.

There may also be instances where mobile device 1030 receives duplicate MT SMS messages. For example, assume that SMS-C 1006 receives an SMS message destined for mobile device 1030, and sends the MT SMS message to EVDO network 1004. If SMS-C 1006 receives an error message back as the result of a SIP timeout (see FIG. 19), then SMS-C 1006 will fail over by sending the SMS message to 1xRTT network 1002. Thus, mobile device 1030 will receive the SMS message from 1xRTT network 1002. However, even though SMS-C 1006 received an error message due to a SIP timeout, BMGW 1022 may still be able to route the SMS message to mobile device 1030. Thus, mobile device 1030 will receive two copies of the same SMS message. When this scenario occurs, mobile device 1030 first identifies that it has received a duplicate copy of an SMS message. Mobile device 1030 then deletes one of the copies of the SMS message.

Although specific embodiments were described herein, the scope of the invention is not limited to those specific embodiments. The scope of the invention is defined by the following claims and any equivalents thereof.

We claim:

1. An apparatus comprising:
    a session database configured to store session information for a mobile device that has established a data session over a broadband data network;
    an interface configured to receive a Mobile Originated (MO) Short Message Service (SMS) message from the mobile device; and
    a message processor configured to verify that the MO SMS message is valid by comparing header information of the MO SMS message with the session information stored in the session database, to identify a Short Message Service Center (SMS-C) for the MO SMS message if the MO SMS message is valid, and to route the MO SMS message to the identified SMS-C through the interface, wherein the message processor is further configured to send an error message over the broadband network to the mobile device to cause the mobile device to attempt to send the MO SMS message over a voice network as a fail over when the MO SMS message is invalid.

2. The apparatus of claim 1 wherein:
    the interface is further configured to receive a notification message from an Authentication, Authorization, and Accounting (AAA) server in the broadband data network that the data session has been set up involving the mobile device; and
    the message processor is further configured to process the notification message to identify the session information included in the notification message, to validate the session information, and to store the session information for the mobile device in the session database if valid.

3. The apparatus of claim 1 wherein:
    the message processor is further configured to validate the MO SMS message by comparing a mobile IP (MIP)

address in a header of the MO SMS message with a MIP address of the mobile device as stored in the session database.

4. The apparatus of claim 1 wherein:
the message processor is further configured to validate the MO SMS message by comparing a mobile directory number (MDN) in a header of the MO SMS message with an MDN of the mobile device as stored in the session database.

5. The apparatus of claim 1 wherein:
the message processor is further configured to validate the MO SMS message by comparing a session setup timestamp in a header of the MO SMS message with a session setup timestamp as stored in the session database.

6. The apparatus of claim 1 wherein:
the SMS-C is configured to receive a Mobile Terminated (MT) SMS message destined for the mobile device, to store the MT SMS message, to determine whether the mobile device has broadband data capabilities, and to forward the MT SMS message to the broadband data network responsive to a determination that the mobile device has broadband data capabilities.

7. The apparatus of claim 6 wherein:
the SMS-C is configured to identify a pre-provisioned address for the broadband messaging gateway, to check the availability of the broadband messaging gateway, and to forward the MT SMS message to the broadband messaging gateway based on the pre-provisioned address if the broadband messaging gateway is available.

8. The apparatus of claim 6 wherein:
the SMS-C is configured to receive an error message from the broadband messaging gateway indicating that the MT SMS message cannot be delivered over the broadband data network, and to forward the MT SMS message to the voice network in response to the error message as a fail over.

9. The apparatus of claim 1 wherein:
the interface is further configured to receive a MT SMS message destined for the mobile device; and
the message processor is further configured to verify a status of the data session involving the mobile device in the broadband data network, to identify a mobile IP (MIP) address for the mobile device if the status of the data session is active, and to route the MT SMS message to the mobile device through the interface based on the MIP address.

10. A method comprising:
storing session information in a broadband messaging gateway for a mobile device that has established a data session over a broadband data network;
receiving a Mobile Originated (MO) Short Message Service (SMS) message in the broadband messaging gateway from the mobile device;
verifying that the MO SMS message is valid by comparing header information of the MO SMS message with the stored session information;
identifying a Short Message Service Center (SMS-C) for the MO SMS message if the MO SMS message is valid;
and routing the MO SMS message to the identified SMS-C; and
sending an error message over the broadband to the mobile device to cause the mobile device to attempt to send the MO SMS message over a voice network as a fail over when the MO SMS message is invalid.

11. The method of claim 10 further comprising:
receiving a notification message in the broadband messaging gateway from an Authentication, Authorization, and Accounting (AAA) server in the broadband data network that the data session has been set up involving the mobile device;
processing the notification message to identify the session information included in the notification message;
validating the session information; and
storing the session information for the mobile device if valid.

12. The method of claim 10 wherein verifying that the MO SMS message is valid comprises:
comparing a mobile IP (MIP) address in a header of the MO SMS message with a stored MIP address of the mobile device.

13. The method of claim 10 wherein verifying that the MO SMS message is valid comprises:
comparing a mobile directory number (MDN) in a header of the MO SMS message with a stored MDN of the mobile device.

14. The method of claim 10 wherein verifying that the MO SMS message is valid comprises:
comparing a session setup timestamp in a header of the MO SMS message with a stored session setup timestamp.

15. The method of claim 10 further comprising:
receiving a Mobile Terminated (MT) SMS message destined for the mobile device in the SMS-C;
storing the MT SMS message;
determining whether the mobile device has broadband data capabilities; and
forwarding the MT SMS message to the broadband data network responsive to a determination that the mobile device has broadband data capabilities.

16. The method of claim 14 further comprising:
receiving an error message in the SMS-C from the broadband messaging gateway indicating that the MT SMS message cannot be delivered over the broadband data network; and
forwarding the MT SMS message to a voice network in response to the error message as a fail over.

17. The method of claim 10 further comprising:
receiving a Mobile Terminated (MT) SMS message destined for the mobile device in the broadband messaging gateway;
verifying a status of the data session involving the mobile device in the broadband data network;
identifying a mobile IP (MIP) address for the mobile device if the status of the data session is active; and
routing the MT SMS message to the mobile device based on the MIP address.

* * * * *